United States Patent
Padfield et al.

(10) Patent No.: US 11,250,552 B1
(45) Date of Patent: Feb. 15, 2022

(54) MODEL TRAINING USING INCOMPLETE INDICATIONS OF TYPES OF DEFECTS PRESENT IN TRAINING IMAGES

(71) Applicant: Amazon Technologies, Inc., Seattle, WA (US)

(72) Inventors: Dirk Padfield, Seattle, WA (US); Suren Kumar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 16/882,270

(22) Filed: May 22, 2020

Related U.S. Application Data

(63) Continuation of application No. 15/994,300, filed on May 31, 2018, now Pat. No. 10,769,766.

(51) Int. Cl.
| | | |
|---|---|---|
| G06T 7/00 | (2017.01) | |
| G06K 9/62 | (2006.01) | |
| G06K 9/03 | (2006.01) | |
| G06N 3/08 | (2006.01) | |
| G06N 3/04 | (2006.01) | |

(52) U.S. Cl.
CPC ............ *G06T 7/0002* (2013.01); *G06K 9/036* (2013.01); *G06K 9/626* (2013.01); *G06K 9/6253* (2013.01); *G06K 9/6259* (2013.01); *G06K 9/6277* (2013.01); *G06N 3/0472* (2013.01); *G06N 3/08* (2013.01); *G06T 2207/20081* (2013.01); *G06T 2207/20084* (2013.01); *G06T 2207/20092* (2013.01); *G06T 2207/30168* (2013.01)

(58) Field of Classification Search
CPC ...... G06K 9/036; G06K 9/626; G06K 9/6253; G06K 9/6259; G06K 9/6277; G06N 20/00; G06T 7/0002; G06T 2207/20081; G06T 2207/20084; G06T 2207/20092; G06T 2207/30168
See application file for complete search history.

(56) References Cited

U.S. PATENT DOCUMENTS

| | | |
|---|---|---|
| 2019/0102646 A1 | 4/2019 | Redmon et al. |
| 2019/0294923 A1 | 9/2019 | Riley et al. |
| 2019/0325259 A1 | 10/2019 | Murphy |

OTHER PUBLICATIONS

Argyriou, et al. Multi-task feature learning. In Advances in neural information processing systems, pp. 41-48, 2007.
(Continued)

*Primary Examiner* — Daniel G Mariam
(74) *Attorney, Agent, or Firm* — Knobbe, Martens, Olson & Bear, LLP

(57) ABSTRACT

Machine learning techniques are disclosed for training a model to identify each of multiple different classes in images, based on training data where each training image may not be labeled in a complete manner with respect to the classes. The disclosed training techniques use a new label value to indicate when a ground truth value is unknown for a particular class, and do not penalize the machine learning model for output predictions that do not match the label value representing unknown ground truth. The disclosed processes may, for example, be used to train a model to detect each multiple types of image defects based on incomplete information provided by human reviewers who accept and reject images based on whether any of the types of image defects are found.

20 Claims, 8 Drawing Sheets

(56) References Cited

OTHER PUBLICATIONS

Chen, et al, . Mxnet: A flexible and efficient machine learning library for heterogeneous distributed systems. arXiv preprint arXiv:1512.01274, 2015.

Chen, et al. Graph-structured multi-task regression and an efficient optimization method for general fused lasso. arXiv preprint arXiv:1005.3579, 2010.

Chua, et al. Nus wide: a real-world web image database from national university of singapore. In Proceedings of the ACM international conference on image and video retrieval, p. 48. ACM, 2009.

Dalal, et al. Histograms of oriented gradients for human detection. In Computer Vision and Pattern Recognition, 2005. CVPR 2005. IEEE Computer Society Conference on, vol. 1, pp. 886-893. IEEE, 2005.

Deng, et al. Imagenet: A large-scale hierarchical image database. In Computer Vision and Pattern Recognition, 2009. CVPR 2009. IEEE Conference on, pp. 248-255. IEEE, 2009.

Evgeniou, et al. Learning multiple tasks with kernel methods. Journal of Machine Learning Research, 6(Apr.):615-637, 2005.

Girshick. Fast r-cnn. In Proceedings of the IEEE international conference on computer vision, pp. 1440-1448, 2015.

Glorot, et al. Understanding the difficulty of training deep feedforward neural networks. In Proceedings of the Thirteenth International Conference on Artificial Intelligence and Statistics, pp. 249-256, 2010.

He, et al. Deep residual learning for image recognition. In Proceedings of the IEEE conference on computer vision and pattern recognition, pp. 770-778, 2016.

Huang, et al. Multi-task deep neural network for multi-label learning. In Image Processing (ICIP), 2013 20th IEEE International Conference on, pp. 2897-2900. IEEE, 2013.

Kato, et al. Multi-task learning via conic programming. In Advances in Neural Information Processing Systems, pp. 737-744, 2008.

Kim, et al. Tree-guided group lasso for multi-task regression with structured sparsity. 2010.

Lin, et al. Microsoft coco: Common objects in context. In European conference on computer vision, pp. 740-755. Springer, 2014.

Ruder. An overview of multi-task learning in deep neural networks. arXiv preprint arXiv:1706.05098, 2017.

Tibshirani. Regression shrinkage and selection via the lasso. Journal of the Royal Statistical Society. Series B (Methodological), pp. 267-288, 1996.

Wang, et al. Cnn-rnn: A unified framework for multi-label image classification. In Proceedings of the IEEE Conference on Computer Vision and Pattern Recognition, pp. 2285-2294, 2016.

Xue, et al. Multi-task learning for classification with dirichlet process priors. Journal of Machine Learning Research, 8(Jan.):35-63, 2007.

Zhang, et al. A survey on multi-task learning. arXiv preprint arXiv:1707.08114, 2017.

Zhang, et al. Ml-knn: A lazy learning approach to multi-label learning Pattern recognition, 40(7):2038-2048, 2007.

MODEL TRAINING USING INCOMPLETE INDICATIONS OF TYPES OF DEFECTS PRESENT IN TRAINING IMAGES

PRIORITY CLAIM

This application is a continuation of U.S. application Ser. No. 15/994,300, filed May 31, 2018, the disclosure of which is hereby incorporated by reference.

BACKGROUND

Artificial intelligence describes computerized systems that can perform tasks typically considered to require human intelligence. The capability to learn is an important aspect of intelligence, as a system without this capability generally cannot become more intelligent from experience. Machine learning is a field of computer science that gives computers the ability to learn without being explicitly programmed, for example enabling artificial intelligence systems to learn complex tasks or adapt to changing environments.

BRIEF DESCRIPTION OF THE DRAWINGS

Specific embodiments and inventive features will now be described with reference to the drawings, which are provided for purposes of illustration, and not limitation. Throughout the drawings, reference numbers may be re-used to indicate correspondence between referenced elements. Although certain ones of the drawings depict grayscale images, the original color present in these images is addressed in certain portions of the description.

DETAILED DESCRIPTION

Figures 1A, 1B:
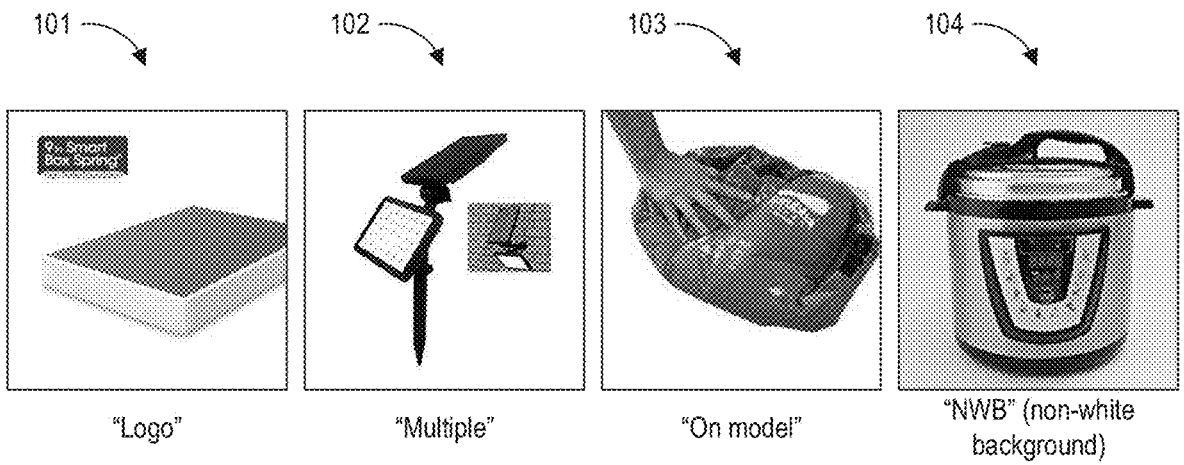
FIG. 1A illustrates example types of image defects that can be depicted in images.
FIG. 1B illustrates an example table of label values that can be used to train a machine learning system to provide multi-label classification from partial information, for example using the defects of FIG. 1A.

The present disclosure is generally directed to using artificial intelligence or machine learning systems to automatically determine which of a pre-defined set of visual features are depicted in an image. These visual features are referred to as the "classes" that the models are trained to recognize. Each class can be considered as a separate task—an instance of a classification problem asking whether that class is depicted in an image, where multiple classes may or may not co-occur in a given image. In some examples these classes can be image quality defects, where the presence of such defects can be used, for example, to reject user-uploaded images from being presented in an electronic catalog. The described machine learning framework can extract information about image quality defects, including whether an image is blurry, or contains a logo, watermark, non-white background, or other desired defects, solely from visual data (e.g., values of the pixels of the image). The present disclosure also relates to training such artificial intelligence or machine learning systems using partial information. Partial information refers to an image that has been identified as depicting one or more of the classes where this positive identification for certain classes does not reliably indicate that the other classes are not also present. The described machine learning framework can detect all the classes present in an image even when partial or incomplete human ground truth labels are used for training. The training process includes a new representation for the notion of unknown or missing labels, as well as corresponding training functions that account for the possible missing labels on a training image.

Maintaining high quality of images in an electronic catalog creates a good user experience and may lead to more interactions between users and content of the catalog. However, in many electronic catalogs images of items are uploaded by users. As such, many online catalogs may specify certain image criteria that user-uploaded images should meet if they are to be displayed in the electronic catalog. Currently, the process of ensuring compliance of user-uploaded images with such image criteria heavily relies on human intervention. For example, human reviewers can be presented with a user-uploaded image and asked to select any defects present in the image, where such defects can include image classes prohibited by the image criteria. However, it can be a challenge to scale the image audit throughput to the scale of some electronic catalogs, which can include millions of items, with such items often depicted in multiple user-uploaded photos. The issue of scale assumes even greater importance in scenarios of rapid catalog expansion and entry into newer marketplaces.

The above-described challenges, among others, are addressed in some embodiments by the disclosed solutions to the image defect problems. The described solution can achieve a similar or greater level of accuracy than the human reviewers, and it is highly scalable. Specifically, the disclosed machine learning models can be trained using image annotations obtained from the human reviewers. In use, these trained machine learning models can take image pixel values as input data and can programmatically predict which classes are depicted in the image. Thus, the disclosed trained machine learning models can be considered as an artificially intelligent image reviewer.

In many instances, a single image may have multiple defects present. However, a human reviewer only needs to note one defect for the image to be rejected. Further, the goal of the image review process is to remove a high number of defective images from the catalog, and as a result the human reviewers usually only mark a single conspicuous defect. As such, many images are not annotated with a complete list of all defects present, because the goal of rejecting low-quality images is satisfied by simply noting a single defect. Training data typically must be labeled with its "ground truth" in order to be used for machine learning training. Incomplete labeling results in many images where the ground truth is unknown for certain classes, because a particular defect cannot be presumed as not present simply because the human did not annotate the defect as present. To illustrate, consider that an image is marked with the defect of "blurry," but not marked as having a defect of a non-white background. Because the reviewer has ensured that the image will be rejected by noting the "blurry" defect, their lack of marking of the non-white background defect does not conclusively establish that the image background is white. During labeling of this image for machine learning training, the ground truth for the "blurry" defect is known, but the ground truth label is not known for the non-white background defect. This incomplete labeling is referred to herein as "partial information."

The disclosed training techniques overcome the challenge of partial information by labeling known (user-identified) defects as positive cases, not labeling other defects (e.g., those for which no user feedback has been received) as negative cases, and instead using a new label value for defects with an unknown ground truth. This avoids mislabeling a class as not present, when in fact the class may be present but was just unnoticed or unmarked by the user. In addition, the disclosed training techniques use a novel loss function that accounts for this unknown nature of some classes when it determines how to update the machine learning model's parameters. The loss function measures how different a prediction made by the machine learning model is from its expected value, and then this difference is used to tune the model parameters such that it can make a more accurate prediction. However, in the scenario of partial information, the true expected value is not known. The disclosed loss function checks to determine whether a certain class has an unknown ground truth label. If so, the loss function may not use any information relating to that class to supervise the learning process. As such, the machine learning model is not penalized during training for making "mistakes" with respect to classes having an unknown ground truth. Because the overall training set spans many images with different defects, it should include information regarding each of the image classes in question. By training across a large data set and accounting for unknown ground truth labels, the machine learning model is thus able to use many images with partial information to learn to make "complete" classifications across the entire class set with respect to new images.

As would be appreciated by one of skill in the art, the use of the disclosed machine learning techniques represents a significant technological advance over prior implementations. Specifically, the use of the partial information training schema enables the system to learn how to predict whether each of a predetermined set of classes are depicted in input image data, even though any given training example may only have one known depicted class from the set (with others perhaps being present, perhaps not, with such "ground truth" unknown). This beneficially leverages labeled image data that may already be available from a human reviewer process. Further, the disclosed machine learning system can beneficially improve the accuracy and/or speed of further human review of new images by predicting which classes are present in new image data, and by pre-selecting those classes in an image review user interface for a human reviewer. Alternatively, even without further involvement of human reviewers, the disclosed machine learning system can successfully operate to identify visual features in images, for example for use in removing defective images from a digital catalog. As such, the embodiments described herein represent significant improvements in computer-related technology.

As used herein, the term "item," in addition to having its ordinary meaning, is used interchangeably to refer to an item itself (e.g., a particular product) and to its description or representation in a computer system or electronic catalog. As will be apparent from the context in which it is used, the term may also sometimes be used herein to refer only to the item itself or only to its representation in a computer system.

The present disclosure presents examples of classes in the context of identifying defects in images. It will be appreciated that implementations of the disclosed artificially intelligent image analysis system can be used to identify other types of visual features, for example people, places, event types, other objects depicted in images. Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrative only and are not intended to be limiting.

Overview of Example Training Data

FIG. 1A illustrates example classes 101-104 that can be programmatically identified by a trained machine learning model as described herein. The classes 101-104 represent an example set of image defects that can be depicted in images, and which may result in the image being rejected from display in a particular digital environment such as an electronic catalog. The classes include depiction of a logo 101 (referred to in the images as the defect "logo"), depiction of multiple items 102 (referred to in the images as the defect "multiple"), depiction of an item on a model 103 (referred to in the images as the defect "on model"), and depiction of an item against a non-white background 104 (referred to in the images as the defect "NWB"). These classes can make up the output task set that a given model is trained to predict in some implementations. The output task set can include additional defects in other implementations, for example whether an image is blurry, whether an image depicts a mannequin, whether an image depicts product packaging, and whether an image depicts propping (e.g., whether an item is excessively propped). Other output task sets can include any desired class set, where such classes may be (though may not necessarily be) depicted together in a single image.

FIG. 1A shows a visual exemplar of each of these four example defects. An image is rejected if any of the aforementioned defects are present in the image. A given image might have more than a single defect, such as an image containing both a logo as well as having a non-white background. However, the goal of the human reviewer program—the program that generates labeled data according to some implementations of the present disclosure—is to remove a high number of defective images from the catalog. As a consequence, the human annotators usually mark a single conspicuous defect.

However, the goal of the disclosed machine learning system was to build an automated image defect analysis system that detects all defects present in an image despite often having labels identifying only a single defect. The disclosed techniques can train a deep neural network that can generate information about the presence and/or absence of all the defects based on the images and partially labelled information from human annotators. With respect to this labelled information, one implementation of the review process that generates the labels is as follows. Formally, for the $j^{th}$ image $I_j$, human annotators can 'accept' the image ($d^a_j=1$) or mark the presence of one or more image defects $d^l_j \in \{0,1\}$, $\Sigma_l d^l_j \le m$, for a total of m defects. An image marked 'accept' indicates the absence of all defects. However, for an image marked with one or more defects, this may only provide incomplete information on individual defects as human annotators do not explicitly evaluate each image defect. To create a learning problem, the techniques of the present disclosure represent the lack of any information ('unknown') category with −1, and use 0, 1 to represent the binary information for each category. The two different scenarios for each image as shown in the table of FIG. 1B.

FIG. 1B illustrates an example table 105 of label values that can be used to train a machine learning system to provide such multi-label classification from partial information, for example using the task set of FIG. 1A. The table 105 includes a first column for label values for an "accept" class. In the depicted example, a value of 0 in the "accept" column indicates that the image was not accepted because it depicts at least one defect, while a value of 1 indicates that the image was accepted and depicts no defects. For the various defects, a value of 1 indicates that the image was labeled as depicting that defect by a human reviewer. A value of 0 indicates that the image was labeled as not depicting that defect by a human reviewer, for example by the human reviewer accepting the image (and therefore indicating that it does not depict any defects). A value of −1 means that it is not possible to conclusively say whether a defect is depicted or not depicted by an image, based on the information provided by the human reviewer. Thus, the second row of the table represents the label values for an accepted image, while the first row of the table represents the label values for an image marked as depicting a logo. It will be appreciated that the particular values selected for positive, negative, and unknown ground truth labels represent one possibility, and that in other implementations any three distinct values can be used for these labels.

Overview of Example Machine Learning Systems

Using this partial information, the disclosed techniques can build a model that can predict information corresponding to all the defects. Specifically, the disclosed techniques can train a network based on a collection of annotated images where the $j^{th}$ image ($I_j$, $d^l_j$, $d^a_j$) has complete information for accept or reject of $d^a_j \in \{0,1\}$ but only partial information for defect reasons, $d^l_j \in \{-1,0,1\}$. The disclosed techniques treat this problem as a multi-label problem, and explicitly handle the 'unknown' annotation by setting the gradient of a defect-specific sub-problem to 0.

The image defect classification problem can also suffer from class imbalance because there might be very few examples of an individual defect. The disclosed techniques address the issue of class imbalance by introducing weights within the loss function formulation. Finally, the higher-level prediction of 'accept/reject' can require a high defect classification accuracy for each defect which may not be possible either due to fewer examples or the semantic complexity of a specific defect. In order to overcome the challenge of high individual defect classification accuracy, some embodiments can implement a shortcut connection which directly predicts the 'accept/reject' decision for each image (e.g., accept/reject becomes one of the output classes of the model, in addition to the desired classes).

Figure 2A:
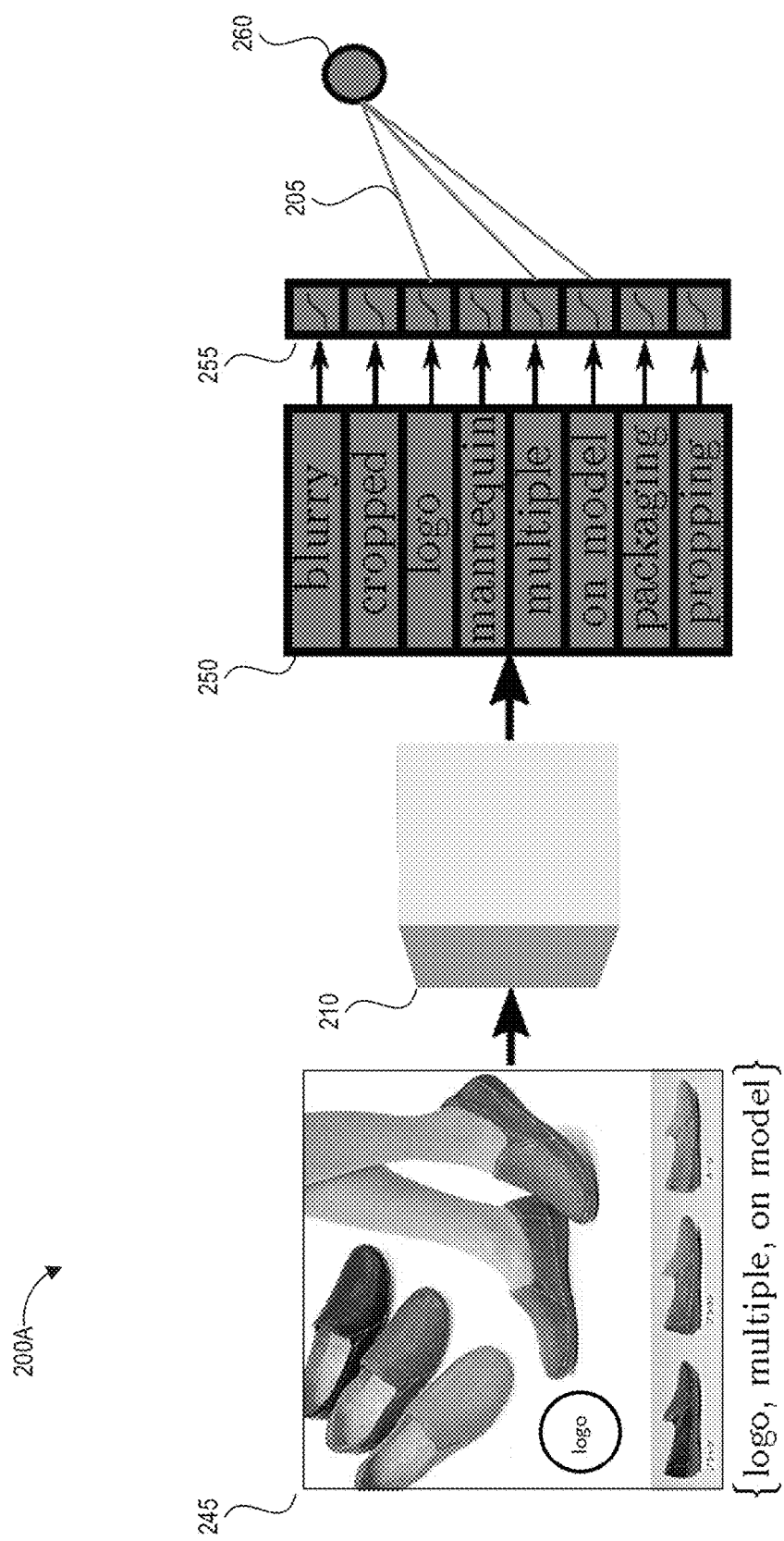
FIGS. 2A-2B illustrate block diagrams of example machine learning systems that can be trained to provide multi-label image classification, for example using the label values of FIG. 1B.
Figure 2B:
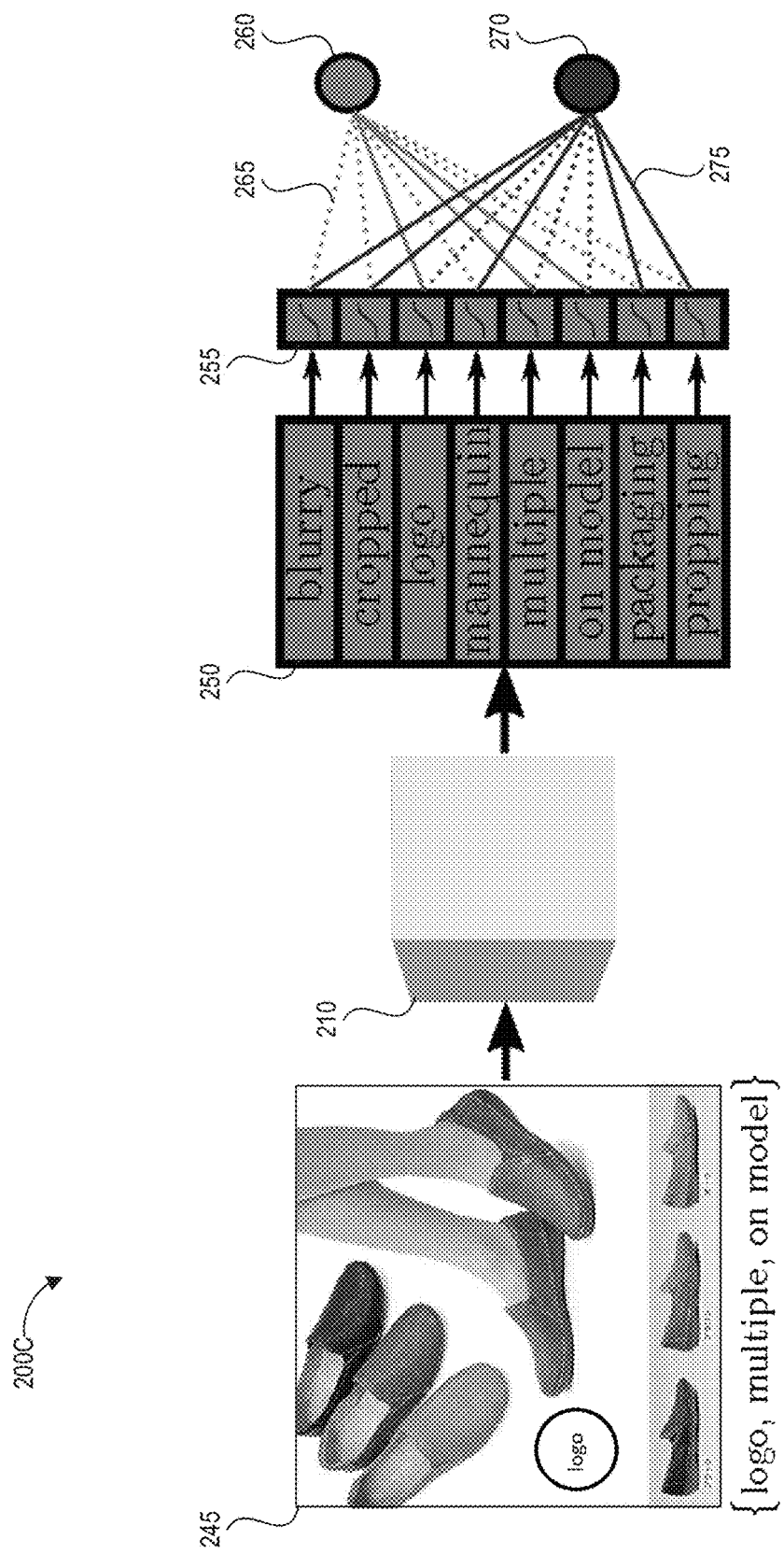

FIGS. 2A-2B illustrate block diagrams of example machine learning models that can be trained using such techniques to provide multi-label image classification, for example using label values as depicted in FIG. 1B. FIG. 2A depicts a first model 200A that predicts the presence of each defect in the output task set, which in the illustrated example are logo, multiple, on model, and NWB (corresponding to the example defects depicted in FIG. 1A). The model receives image data representing an input image 245, processes the image data through a neural network 210 (represented schematically as a cube in the figures) including a last fully connected layer 250, provides values output by nodes of the fully connected layer to corresponding nodes in a sigmoid layer 255, and uses the output of the sigmoid layer 255 to determine the probability of each defect being depicted.

The image data 245 can include values for each pixel in an array of pixels. These values can reflect the color of sensed light corresponding to the pixel (e.g., one of a given number of wavelength ranges) and/or intensity values reflecting the intensity of the sensed light. Some implementations may use only pixel values as the input data for the neural network 210. Some implementations may use a transformation of the pixel values as the input, for example a Fourier transformation. Other implementations can generate numerical encodings of metadata associated with the image, for example a title of the image (or depicted item), a type/category of item depicted in the image, or other metadata associated with the image, and can use these encodings to supplement the pixel values. Some implementations can additionally use depth information representing how far objects depicted in the image are from a focal plane of the image capture device that recorded the image. These may be extracted from single images using photoclinometry, for example.

Neural networks such as the neural network 210 can be used to model complex relationships between inputs and outputs and to find patterns in data, where the dependency between the inputs and the outputs cannot be easily ascertained. A neural network typically includes an input layer, one or more hidden layers, and an output layer, with each layer including a number of nodes. The number of nodes can vary between layers. A neural network is typically considered "deep" when it has two or more hidden layers. The input layer can have as many nodes as needed to intake the numerical representations of value of the pixels of the image (e.g., eight nodes per pixel if a pixel is represented by eight bits). In one example the neural network is a fully connected neural network, that is, each node in the input layer is connected to each node in the first hidden layer, each node in the first hidden layer is connected in turn to each node in the subsequent layer, and so on until each node in the final hidden layer is connected each node in the node in the output layer. Other implementations may have varying connection structures.

For example, the artificial neural network 210 may be a convolutional neural network ("CNN"). A CNN is a type of artificial neural network that is commonly used for image analysis. Like the artificial neural network described above, a CNN is made up of nodes and has learnable weights. However, the nodes of a layer are only locally connected to a small region of the width and height layer before it (e.g., a 3×3 or 5×5 neighborhood of image pixels), called a receptive field. During training, a given CNN may learn the weights of these connections and/or the size of the receptive field. The hidden layer weights can take the form of a convolutional filter applied to the receptive field. In some implementations, the layers of a CNN can have nodes arranged in three dimensions: width, height, and depth. This corresponds to the array of pixel values in each. The nodes in each convolutional layer of a CNN can share weights such that the convolutional filter of a given layer is replicated across each receptive field of that layer, reducing the overall number of trainable weights and possibly increasing applicability of the CNN to data sets outside of the training data. Values of a layer may be pooled to reduce the number of computations in a subsequent layer (e.g., values representing certain pixels, such as the maximum value within the receptive field, may be passed forward while others are discarded). Further along the depth of the CNN pool masks may reintroduce any discarded values to return the number of data points to the previous size. A number of layers, optionally with some being fully connected, can be stacked to form the CNN architecture.

The weights of these connections are learned from data during the training process, for example through backpropagation in which the network parameters are tuned to produce expected outputs given corresponding inputs in labeled training data. Thus, the artificial neural network is an adaptive system that is configured to change its structure (e.g., the connection configuration and/or weights) based on information that flows through the network during training, and the weights (e.g., parameters) of the hidden layers can be considered as an encoding of meaningful patterns in the data. The nodes can multiply outputs from connected nodes by learned weights, sum the weighted inputs, and use an activation function to output a value (e.g., rectified linear unit (ReLU), sigmoid, hyperbolic tangent, leaky ReLU).

The neural network 210 can be, in some implementations, the ResNet-50 neural network, which is an instantiation of a neural network that includes 50 convolutional layers with intermediate skip connections. Some implementations can remove fully connected layers from ResNet-50 to reduce the model complexity, because such fully connected layers alone may contain around 8% of the total parameters of the model. However, a last layer of the network is fully connected and shown separately as layer 250 that feeds into the sigmoid layer 255.

The fully connected layer 250 may have the same number of nodes as the sigmoid layer 255, and the number of nodes may be equal to the number of output tasks. Each node of the fully connected layer 250 can be directly and locally connected to just one corresponding node of the sigmoid layer 255 in some implementations, as the sigmoid function may use only the corresponding fully-connected score for a defect to generate a valid probability for each task. Each node of the sigmoid layer 255 can individually apply the sigmoid function to its input(s), and can be considered as a "task head" for a corresponding class. The "task head" can be thought of as a way of handling the class. The idea is that the detection of each class is treated as its own task and thus is given its own "task head". The sigmoid function takes input values and outputs a value between 0 and 1, such that each task head outputs a probabilistic value for a particular class.

Specifically, the sigmoid function can be represented as:

$$p_j^k = \frac{1}{1 + \exp(s_j^k)} \qquad (1)$$

to transform the raw score from corresponding node of the last fully connected layer $s_j^k \in \{-\infty, \infty\}$ to valid probabilities. The probabilities for each defect are pseudo-independent in that the probability for each defect depends on the score output by the corresponding node of the fully connected layer 250. The image data 245 may be accepted only if the image is predicted to contain none of the images. This can involve an accept/reject module that analyzes the output scores from each task head and determines whether any individual score is higher than a predetermined threshold value indicating that the defect is likely depicted.

Some variations of the model 200A can add the 'accept/reject' decision to the output task set by additionally modeling the probability that the image will be accepted or rejected. The final fully connected layer 255 would include one additional node compared to the number depicted in FIG. 2A, with this additional node representing the class of the accept probability. Similarly, the sigmoid layer 255 would include an additional with this additional node representing the task head for generating the accept probability. The output scores of such a model can represent the individual probabilities of each defect, as well as the global probability of accepting or rejecting the image. The image 245 may be classified as accepted if the output score for the accept class is greater than the score for any other class (e.g., the individual rejection reasons), and/or if none of the rejection reasons is triggered by the output score.

The model 200A can be trained using a learning framework that minimizes a loss function 260 to reduce the discrepancy between the output of the neural network 210 and the information from the human associate decision while not penalizing the 'unknown' labels on images from training data. During training of models that include an "accept" class, the learning framework may remove the loss for the accept versus reject sub-problem (e.g., the problem of modeling whether the image will be accepted or rejected). Given a deep neural network $\mathcal{F}$ parameterized by weights θ, which takes in an image $I_j$ and outputs a vector of dimension m+1, the loss function can be defined as:

$$\mathcal{L}\left[\mathcal{F}(\theta, I_j), d_j^i, d_j^a\right] = \qquad (2)$$
$$\sum_i \mathbb{1}\left(d_j^i \neq -1\right) \mathcal{L}^i\left(\mathcal{F}(\theta, I_j), d_j^i\right) + \mathcal{L}^a\left(\mathcal{F}(\theta, I_j), d_j^a\right)$$

where $\mathbb{1}$ denotes an indicator function and $\mathcal{L}^i(\mathcal{F}(\theta, I_j), d_j^i)$, $\mathcal{L}^a(\mathcal{F}(\theta, I_j), d_j^a)$ represents the cross-entropy loss function corresponding to the individual defect reason (or accept/reject probability).

The indicator function $\mathbb{1}$ checks whether the label value for a given class is set to the unknown value, which here is −1. The particular value of this label for representing unknown ground truth can be set to other values in other implementations, with the value being different from the values for the positive and negative ground truth labels. If the label value for a given class is set to the unknown value, the indicator function identifies this and the loss function 260 will not use that information to supervise learning or otherwise impact the loss function. The result is that the neural network 210 is not penalized for making "mistakes" on unknown values, but rather only for known values (here, represented by 1 or 0 as the label value). This is visually depicted in FIG. 2A by only having the task heads for logo, multiple, and on model connected to the loss function 260. The connections 205 can be dynamically varied based on which classes are labeled as known positive, such that the known positive classes connect to the loss function and contribute to the update of the weights of the neural network 210. During inference, the loss function 260 is removed and the output of the model 200A is the output of the sigmoid layer 255.

Some embodiments can be trained to minimize cross-entropy loss using the loss function 260. Dropping the defect specific notation and the inputs to each function, the cross-entropy loss function can be represented as:

$$\mathcal{L}(y,d) = w^l [w_p d \log(y) w_n (1-d) \log(1-y)] \quad (3)$$

where y is the corresponding prediction from $\mathcal{F}(\theta, I_j)$ and d represents the ground truth label (e.g., the values depicted in FIG. 1B).

Furthermore, this framework can weight individual defect losses using $w^l$ and positive and negative cases using $w_p$ and $w_n$ respectively. Weighting the positive and negative losses helps in imbalanced cases where a training data set may have very few examples of a particular defect compared to the total number of acceptable images. Equation 3 above may be unchanged by images the label d=−1 and using the indicator function in Equation 2. By using the indicator function to identify unknown ground truth labels, the loss function can ignore the predictions corresponding to 'unknown' category and generates individual defect classification using a weighted cross-entropy loss.

The model 200A can be trained via back propagation to minimize the loss function in Equation 2. During back propagation, the gradient of an individual classifier (e.g., the node of the fully connected layer 250, 230 and the corresponding node of the sigmoid layer 255, 235) as represented in Equation 3 can be:

$$\frac{d\mathcal{L}}{dy}(d=1) = -w^l w_p \frac{1}{y}, \quad \frac{d\mathcal{L}}{dy}(d=0) = w^l w_n \frac{1}{1-y} \quad (4)$$

The gradients with respect to any network parameter θ can further be derived using the chain rule. Because the model 200A dis-entangles the separate sub-problems (e.g., probability scores for each output task), the learning framework can use a different depth for each problem based on semantic complexity. Additionally, the separation of defects allows for easily dropping a rejection reason. Compared to a combination of individual classifiers, the model 200A can generate an accept/reject decision and a decision about individual defects in a single forward pass on a single model. In addition, the model 200A can be more memory efficient than a framework that requires maintaining a different model for each individual defect.

The model 200A was tested and showed a high performance on the overall metric of whether or not an image is acceptable. However, because the network is not penalized for 'unknown' labels, it was discovered during testing of some implementations that the neural network 210 may generate many more rejection reasons than are present in the image, in some implementations. Such additional false detections would be sent to the users who uploaded the images, which could result in a bad user experience since the user would not understand why the rejections are being marked. Thus, to achieve the goals of removing defective images and maintaining positive user experience for the users uploading images, the models should meet the requirements of specificity in image defect with only partial ground truth information.

FIG. 2B represents another model 200B for the disclosed multi-label prediction. The model 200B solves the above-described challenge with the model 200A by introducing a regularization on the network learning by using prior information that comes from the intuition that most images contain only a few defects. The prior knowledge of sparsity in image defects can be imposed by 'nudging' the 'unknown' labels to be absent. This can be implemented by adding a small penalty whenever the neural network 210 predicts an 'unknown' label to be present in an image. Using this penalty, the learning framework can push the neural network 210 to predict multiple image defects only in the case of overwhelming image evidence. While the model 200A does not use unknown classes to impact the update of network weights, the model 200B uses regularization to add a small penalty to the update of network weights. Testing has demonstrated that imposing this small rejection penalty has a similar effect to $l_1$ norm regularization of the network output. Notably, $l_1$ norm regularization is often used within deep neural network training to improve generalization performance and used in general machine learning to prevent overfitting, but the disclosed learning framework applies it here in a different manner. The learning framework introduces task sparsity by adding a regularization loss function on the probabilistic output of each task. This is different from regularization loss on weights of the deep neural network, which is often used to induce feature selection in deep neural networks. In this manner, the learning framework for the model 200B models task-selection (sparsity constraint) within multi-task learning to generate a multi-task model that induces sparsity across tasks. The below description will describe two different types of task-selection regularization that can be used to achieve this goal.

Similar to the model 200A, the model 200B also includes a deep neural network 210 which can include convolutional layers and/or fully connected layers. Similar to FIG. 2A, FIG. 2B shows the final, fully connected layer 250 of this deep neural network 210 separately, for purposes of showing its data connections to the sigmoid layer 255. In the example of FIG. 2B, additional image defects are used in the output class (blurry, cropped, logo, mannequin, multiple, on model, packaging, propping), and the accept/reject decision class has been dropped. The nodes of the fully connected layer 250 are labeled with the defect to which they correspond, and each node feeds its output into a corresponding node of the sigmoid layer 255.

During training, the nodes of the sigmoid layer 255 are fully connected to one of a cross-entropy regularizer 260 and a sparsity regularizer 270. These connections are used selectively such that each node of the sigmoid layer 255 is connected to one or the other of the cross-entropy regularizer 260 and sparsity regularizer 270 based on the label value of the corresponding defect. As illustrated, the connections can take one of two forms: active 275, shown by solid lines, and inactive 265, shown by dotted lines. Data is transferred from a node of the sigmoid layer 255 to the corresponding one of the cross-entropy regularizer 260 and sparsity regularizer 270 over an active connection 275, but not over an inactive connection. If the label value for a defect indicates that it is present in the image, the connection of the corresponding sigmoid node to the cross-entropy regularizer 260 is activated and its connection to the sparsity regularizer 270 is set to inactive. If the label value for a defect indicates that it is not known whether the defect is present in the image, the connection of the corresponding sigmoid node to the sparsity regularizer 270 is activated and its connection to the cross-entropy regularizer 260 is set to inactive.

Thus, the human-provided labels constitute full information and the corresponding targets are accounted as part of cross-entropy loss. The rest of the rejection reasons contribute to a sparsity regularizer loss. The overall training process aims to minimize the combination of human provided image evidence and a prior on the number of rejection reasons per image. The classes connected to the sparsity regularizer 270 can contribute back to the update of network parameters in a different (perhaps lesser) way than those connected to the cross-entropy regularizer 260. This is based on the premise that if a class is not marked it is probably not depicted, but if the network has overwhelming evidence then it can override the sparsity regularizer 270. During inference, the cross-entropy regularizer 260 and sparsity regularizer 270 are removed, and the sigmoid layer 255 generates probabilistic outputs for each defect.

To illustrate, the example image 245 depicts the defects of logo, multiple, and on model. During training with this image 245, the connections between the sigmoid nodes corresponding to these defects and the cross-entropy regularizer 260 are active connections 275, as depicted by the solid lines. The connections between the sigmoid nodes corresponding to these defects and the sparsity regularizer 270 are inactive connections 265, as depicted by the dashed lines. For the remaining defects (blurry, cropped, mannequin, packaging, and propping), the connections between the sigmoid nodes corresponding to these defects and the sparsity regularizer 270 are active connections 275, as depicted by the solid lines. The connections between the sigmoid nodes corresponding to these defects and the cross-entropy regularizer 260 are inactive connections 265, as depicted by the dashed lines.

The model 200B can be trained using a different learning framework than the model 200A. Similar to the learning framework described above, unknown labels are represented by assigning a label value of −1 to any rejection reason that is not explicitly annotated by a human reviewer. The training dataset consists of N data points, each of the form $(I, d_j)$, where I represents an input image and $d_j$ represents the set of human-provided labels for each task j. The ground truth labels only consist of triggered defect reasons $d_j=1$. The task specific label $d_j$ is represented by 0 for all j in the case of an acceptable image and −1 if the image is not explicitly rejected for defect reason j.

The model 200B is trained of the functional form $F: I \rightarrow \{d_j\}$ to map an input image to multiple rejection labels present in an image. The model 200B generates an output vector y of dimension J, equal to the total number of rejection reasons. Hence, unlike the ground truth data, the prediction of the network reasons about all image defect reasons yielding complete information. The training process involves minimizing discrepancies between the network output and the ground truth annotation over the entire training data. The overall loss for a single data point can be represented by:

$$\mathcal{L}(y, d) = \sum_j w_j L_o(j) + \gamma \mathcal{L}_{wr} + \lambda \sum_j \mathcal{L}_{sr}(j) \quad (5)$$

where $L_o(j)$ and $w_j$ represent the classification loss and weight of each task, respectively, for the defect reason j, and $\mathcal{L}_{wr}$ and $\mathcal{L}_{sr}$ represent the loss corresponding to the weight regularizer and defect sparsity regularizer, respectively, and y represents the probability predicted by the model 200B forward pass for all image defects. Generally, $w_j L_o(j)$ can be considered as a classification loss term of Equation 5, and $\mathcal{L}_{sr}(j)$ can be considered as a sparsity term of Equation 5. The weight regularizer can be a function solely of the network weights and is often used, but the disclosed learning framework has introduced the defect sparsity regularizer, which is a function of class output. Furthermore, the disclosed learning framework can balance between the three different types of loss functions by using the scaling parameters $\lambda$ and $\gamma$.

The disclosed learning framework obtains multi-label decisions using the neural network 210 by first obtaining a J dimensional fully-connected layer output and then applying the sigmoid function to map the continuous values to a probability measure. The sigmoid function is applied independently to the fully-connected output ensuring conditional independence between different tasks, in turn enabling the model 200B to perform predictions for various image defect tasks with a single neural network 210. The classification loss for individual task can be represented by:

$$\mathcal{L}_o(j) = \mathbb{1}(d_j \neq -1)(w_p(j)d_j \log y_j + w_n(j)(1-d_j)\log(1-y_j)) \quad (6)$$

where $\mathbb{1}$ denotes the indicator function, $w_p(j)$ and $w_n(j)$ represent the weights for positive (annotated image defect) and negative (accepted image) categories and $y_j$ is the probability output for the corresponding task. The learning framework uses weighting in the classification loss to balance the high amount of acceptable images against few rejected samples to drive the training of neural network 210 towards better performance on imbalanced data. The classification loss does not contribute to the overall loss if the underlying task label is 'unknown,' per the indicator function. FIG. 2B visually demonstrates the training data and the impact of classification loss and sparsity regularizer. Weight regularizer loss $\mathcal{L} w_r$ is applied to all the weights of the connections between layers (e.g., the network parameters) in the acceptable images against few rejected samples to drive the training of neural.

The sparsity regularizer 270 and cross-entropy regularizer 260 can be configured to perform several implementations of regularization. One implementation is $\mathcal{L}_1$ norm regularization. This form of regularization applies a $l_1$ norm penalty on the output of multiple labels generating task-heads to trigger fewer 'unknown' labels. More concretely, the sparsity inducing loss function can be written as:

$$\mathcal{L}_{sr}(j) = \mathbb{1}(d_j+1)|y_j| \quad (7)$$

where $y_j$ is the output of $j^{th}$ task. Testing demonstrates the impact of this penalty on an individual task head. Since each individual task $y_j$ is the output from a sigmoid layer $$y_j = \frac{1}{1+\exp(-w_j)},$$

the derivative corresponding to the norm penalty is:

$$\frac{\partial \mathcal{L}}{\partial y_j} = 1 \quad (8)$$

$$\frac{\partial y_j}{\partial x_j} = \frac{\exp(-x_j)}{(1+\exp(-x_j))^2}$$

The evolution of an individual task head over a single interaction can be written as:

$$x_j^{i+1} = x_j^i - \delta \frac{\partial \mathcal{L}}{\partial x_j}\bigg|_{x_j^i} \quad (9)$$

where δ is the learning rate.

Another regularization implementation that can be implemented by the sparsity regularizer 270 and cross-entropy regularizer 260 is competitive rejection. The competitive rejection penalty models the intuition that most of the labels that are not provided by human labelers are not triggered in the images. This penalty calculates the weighted cross-entropy loss for all the non-annotated reject reasons with a small weight. A weight of 0 indicates no penalty for including this rejection reason, and a weight of 1 indicates that the penalty for choosing this rejection is as high as any other true rejection reason. The learning framework therefore chooses a small weight so as not to over-penalize the model for choosing this reason. This penalty can be represented by:

$$\mathcal{L}_{sr}(j) = \mathbb{1}(d_j + 1)\log(1 - y_j) \qquad (10)$$

The derivative for the norm penalty can be calculated as:

$$\frac{\partial \mathcal{L}}{\partial y_j} = \frac{-1}{1 - y_j} \qquad (11)$$

$$\frac{\partial y_j}{\partial x_j} = \frac{\exp(-x_j)}{(1 + \exp(-x_j))^2}$$

Similar to Equation 9, the update equation can be written for individual task heads using the gradient update.

In the above models 200A, 200B, the neural network 210 is shared across all tasks, and generates an output (e.g., a vector) of a dimension equal to the number of tasks (e.g., image defects, optionally the "accept" probability). Other models could have been used for the task at hand, but they all have drawbacks compared to the disclosed approaches. The solution to the higher-level problem of an image being acceptable or containing a defect can be obtained by a simple binary classifier. However, a goal of the disclosed models is to go beyond an accept/reject decision to finding the specific image defects. A multi-class solution cannot be used for finding exact reasons because the images can contain multiple defects and, as a consequence, this is a multi-label problem. Another option would be to use binary classifiers in the one-versus-all setting to find exact image defects, but training one-versus-all defect classifiers for each image defect would significantly increase computational costs and require maintaining J different models to obtain a decision on a single image.

In some embodiments, the images in the training data set can be forward passed through any of the models 200A, 200B, after training. The predictions output by the model can be compared to the annotations provided by the human reviewer. If there are discrepancies between the predictions and the labels, this can be considered as an error and another reviewer can determine the correct labeling (e.g., the correct ground truth labeling). If the image was incorrectly labeled, the training phase may then be updated using the correct ground truth labeling for this image (or a number of images).

Overview of Example Execution Environment

Figure 3:
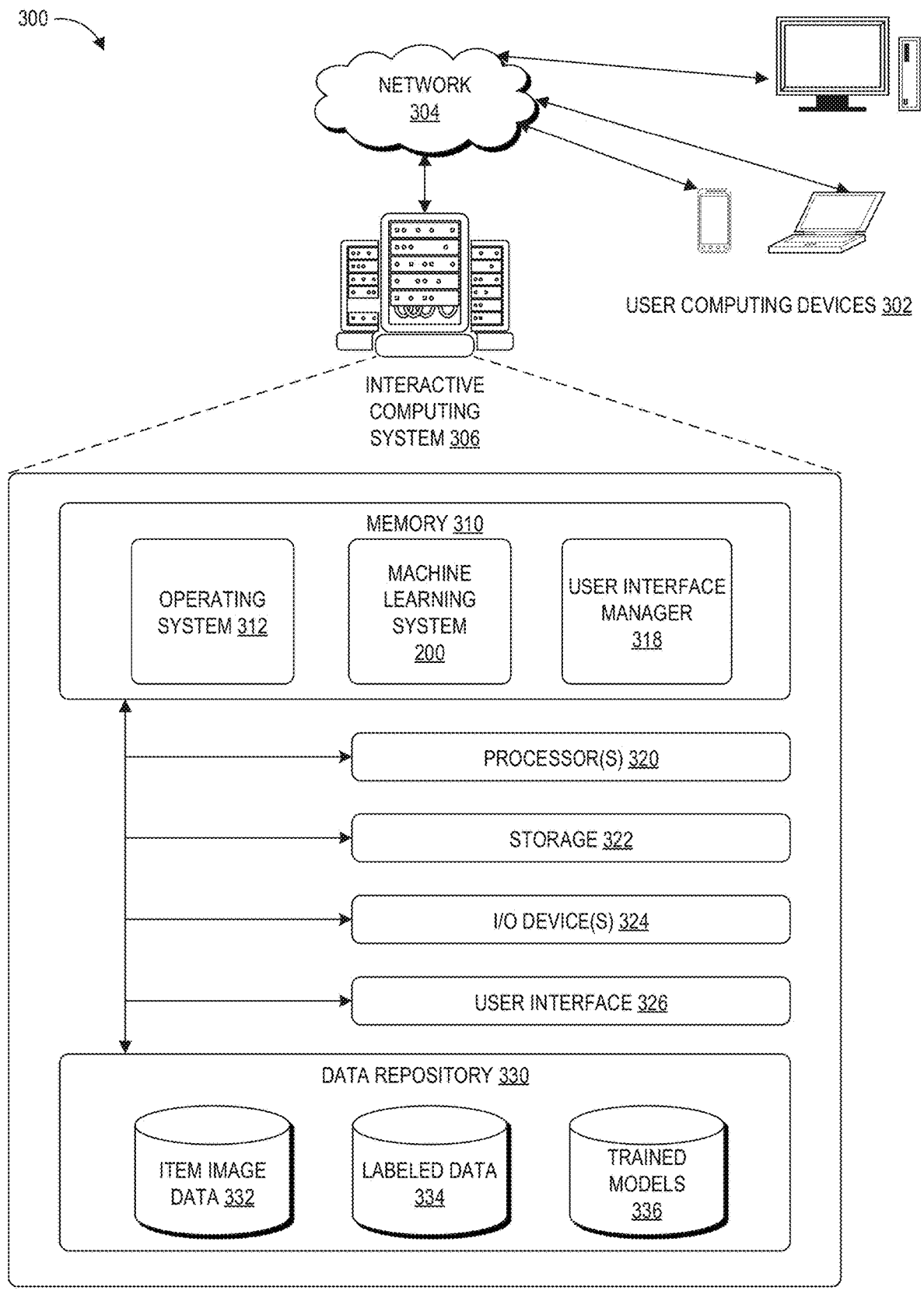
FIG. 3 illustrates a schematic block diagram of an illustrative operating environment in which an interactive computing system provides multi-label image classification, for example using the machine learning systems of FIGS. 2A-2B.

FIG. 3 illustrates a schematic block diagram of an illustrative operating environment 300 in which an interactive computing system 306, for example including a machine learning system 200 that may be any of the options 200A, 200B depicted in FIGS. 2A-2B, provides programmatic multi-task predictions for input images.

The interactive computing system 306 can communicate over network 304 with user devices 302. The network 304 can include any appropriate network, including an intranet, the Internet, a cellular network, a local area network or any other such network or combination thereof. User devices 302 can include any network-equipped computing device, for example desktop computers, laptops, smartphones, tablets, e-readers, gaming consoles, and the like. Users can access the interactive computing system 306 and interact with items therein via the network 304 and can be provided with recommendations via the network 304.

The interactive computing system 306 may include one or more computers, perhaps arranged in a cluster of servers or as a server farm. The memory and processors that make up these computers may be located within one computer or distributed throughout many computers (including computers that are remote from one another) as detailed herein. These servers may be configured to train and use value imputation models and manage searches and recommendations. For example, the interactive computing system 306 may be configured to manage recommendations offered in connection with an electronic marketplace.

The interactive computing system 306 may include at least one memory 310 and one or more processing units (or processor(s)) 320. The memory 310 may include more than one memory and may be distributed throughout the interactive computing system 306. The memory 310 may store program instructions that are loadable and executable on the processor(s) 320 as well as data generated during the execution of these programs. Depending on the configuration and type of memory, the memory 310 may be volatile (such as random access memory ("RAM")) and/or non-volatile (such as read-only memory ("ROM"), flash memory, or other memory). In some examples, the memory 310 may include multiple different types of memory, such as static random access memory ("SRAM"), dynamic random access memory ("DRAM"), or ROM.

The memory 310 can store the program instructions as a number of modules that configure processor(s) 320 to perform the various functions described herein, for example operating system 312 for interacting with the computing system 300, as well as the machine learning system 200 and user interface manager 318, which can be in direct communication with one another or distributed among computing devices within a networked computing system and in communication with each other. The machine learning system 200 can include any of the models 200A, 200B, 200B described above. In addition, the machine learning system 200 can include computer-executable instructions regarding training the models 200A, 200B, 200B, including rules specifying how to assign label values to an image for each specified class. The user interface manager 318 can configure a user interface for image analysis with pre-selected depicted class options based on the output of the machine learning system 200, for example as described with respect to FIG. 6.

The processor 320 may include one or more general purpose computers, dedicated microprocessors, graphics processors, or other processing devices capable of communicating electronic information. Examples of the processor 320 include one or more application-specific integrated circuits ("ASICs"), graphical processing units ("GPUs"), field programmable gate arrays ("FPGAs"), digital signal processors ("DSPs") and any other suitable specific or general-purpose processors. The processor 320 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the interactive computing system 306 may also include additional storage 322, which may include removable storage and/or non-removable storage. The additional storage 322 may include, but is not limited to, magnetic storage, optical disks, and/or solid-state storage. The disk drives and their associated computer-readable media may provide non-volatile storage of computer-readable instructions, data structures, program modules, and other data for the computing devices. The memory 310 and the additional storage 322, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The interactive computing system 306 may also include input/output (I/O) device(s) and/or ports 324, such as for enabling connection with a keyboard, a mouse, a pen, a voice input device, a touch input device, a display, speakers, a printer, or other I/O device. The interactive computing system 306 may also include a user interface 326. The user interface 326 may be utilized by a user to access portions of the interactive computing system. In some examples, the user interface 326 may include a graphical user interface, web-based applications, programmatic interfaces such as application programming interfaces (APIs), or other user interface configurations. The user interface 326 can include displays of the image analysis user interfaces described herein. In some embodiments, the I/O device(s) and/or ports 324 and user interface 326 can be part of a user computing device accessing interactive computing system 306 via network 304.

The interactive computing system 306 also includes a data store 330. In some examples, the data store 330 may include one or more data stores, databases, data structures, or the like for storing and/or retaining information associated with the computing system 300. Thus, the data store 330 may include data structures, such as item image data repository 332, labeled data repository 334, and trained models data repository 336. These each comprise one or more physical data storage devices storing the designated data. The item image data repository 332 can store items depicting images, for example images of items in an electronic catalog. As described herein, image data can include an array of pixel values (e.g., intensity values and/or color values. The data stored in the labeled data repository 140 can store accept or reject label values, label values reflecting user-indicated classes that are depicted in particular images, as well as any label values for unknown classes, as described with respect to FIG. 1B. These values can be stored in association with identifiers of particular images. The trained models data repository 336 can store the parameters and structures of trained models for use in predicting classes depicted in new input images.

Overview of Example Partial-Information Training and Multi-Label Inference

Figure 4A:
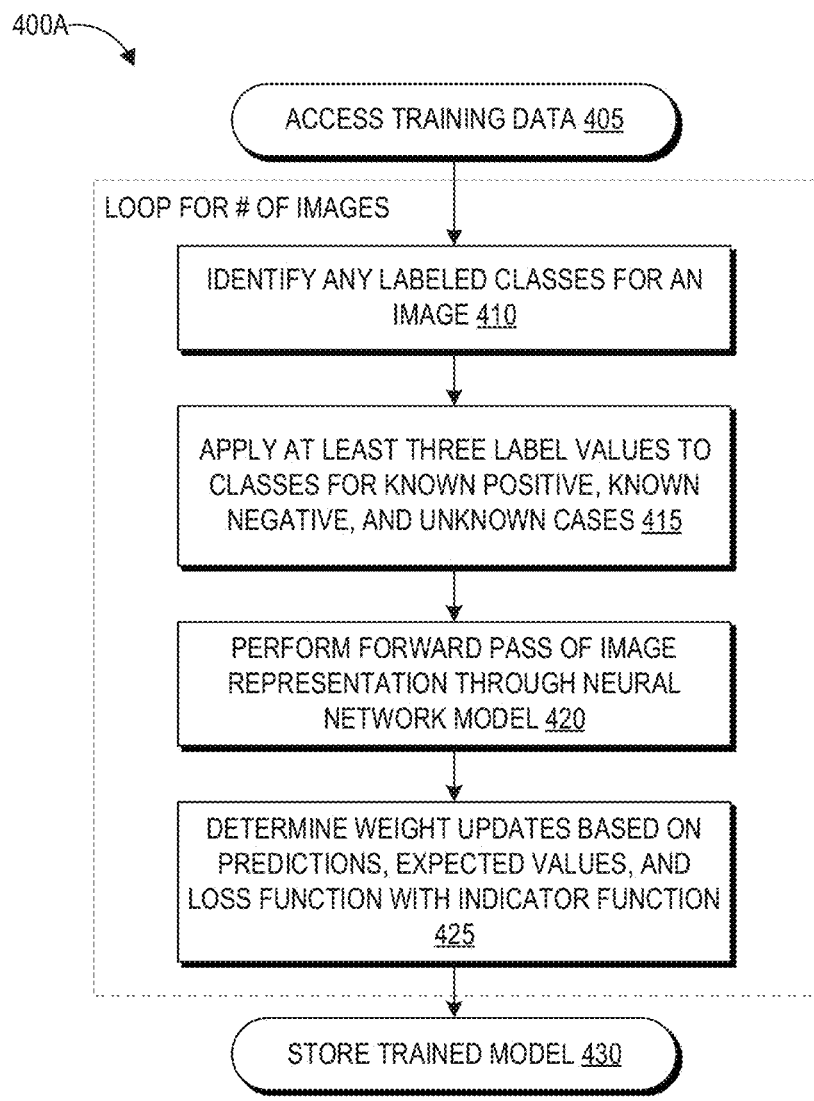
FIG. 4A is a flow diagram depicting an illustrative embodiment of a process that may be implemented for training the machine learning systems of FIGS. 2A-2B for multi-label image classification using partial information.

FIG. 4A is a flow diagram depicting an illustrative embodiment of a process 400A that may be implemented for training the machine learning systems of FIGS. 2A-2B for multi-label image classification using partial information. As described above, that is closed training methods can be used even where only partial labels are generated for training data. As such, the process 400 represents significant time savings for human efforts in generating labeled training data, as well as a robust training technique that accommodates unknown labels in training data.

At block 405, the machine learning system 200 accesses training data including specific images, and either (1) any rejections annotated for a given image by a human reviewer, or (2) an indication that a human reviewer accepted the image. As described above, human reviewers often mark only a single conspicuous defect to achieve the goal of rejecting an image that does not meet the specified criteria, and as such the labeled data originating from this type of review program may have many unknown defects that may or may not actually be depicted in the images.

At block 310, the machine learning system 200 applies at least three label values to each class in the task set for classification. For example, as described in conjunction with FIG. 1B, a positive ground truth (e.g., a defect is present, accept this image) can be labeled with the value "1." A negative ground truth (e.g., no defects are present in an accepted image, no acceptance of an image with defect(s)) can be labeled with the value "0." An unknown ground truth (e.g., no specification either way regarding a particular defect) can be labeled with the value "–1." These are exemplary values used in the disclosed implementation, and other implementations may use other values while achieving a similar effect.

At block 420, the machine learning system 200 performs a forward pass of image pixel values through the neural network. In each of the models 200A, 200B, 200B, this can involve forward passing the pixel values through the layers of the neural network 210, generating a vector at the final layer of the neural network 210 that has the same dimensionality as the task set (e.g., the tasks/classes for which classification is sought), and providing each value of the vector individually to a sigmoid function to generate a probabilistic output per task.

At block 425, the machine learning system 200 can determine updates to the weight of the neural network 210 in order to make more accurate predictions. These updates can be based on the values of the predictions compared to the corresponding values of the labels for known positive and negative ground truth labels (e.g., the predicted likelihood for "logo" compared to the ground truth label for "logo", etc. for each task). As described above, the loss function for training the network includes an indicator function that checks for label values indicating an unknown ground truth. The deviations between the prediction and these labels may not contribute to the weight update (models 200A, 200B) or may contribute little to the weight update (model 200B). Further, as described with respect to the model 200B, some implementations of block 425 can involve regularization to impose sparsity on the predictions of the model 200B.

As shown in FIG. 4A, blocks 410-425 can be repeated as a loop for a certain number of images in the training set. By training the machine learning system 200 over a large set of images, where each image may only be labeled as depicting one of the set of desired classes, the disclosed techniques are able to generate a high performing multi-label model using partially labeled training data.

Figure 4B:
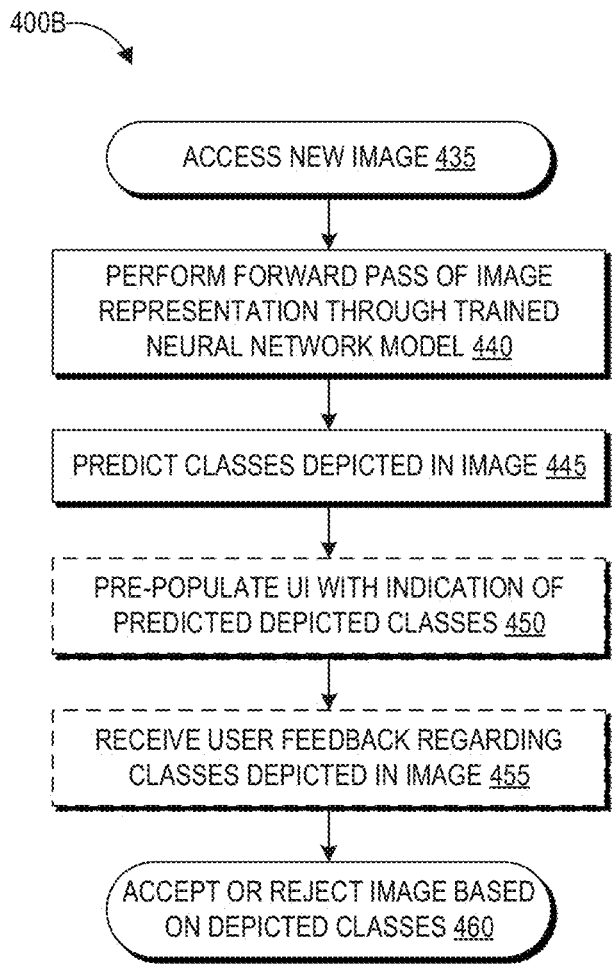
FIG. 4B depicts is a flow diagram depicting an illustrative embodiment of a process for using a machine learning system, trained according to the process of FIG. 4A, to make multi-label predictions based on new image data.

FIG. 4B depicts is a flow diagram depicting an illustrative embodiment of a process 400B for using a machine learning system, trained according to the process of FIG. 4A, to make multi-label predictions based on new image data.

At block 435, the machine learning system 200 can access new image data. This image data includes an array of pixel values, as described above. At block 440, the machine learning system 200 performs of forward pass of these image pixel values through the trained neural network model. The output result of this forward pass can be a probabilistic value (e.g., a likelihood, or value between 0-1) reflecting the likelihood that a given defect is present in the image. Thus, at block 445, the machine learning system 200 can predict which classes are depicted in the image, for example by selecting any class with a probability over a predetermined threshold value (e.g., 50%, 75%, 90%, or more or less depending upon the desired balance between sensitivity and false positives).

At optional block 450, the user interface manager 318 can pre-populate a user interface with an indication of the predicted depicted classes. This user interface may be shown to a human reviewer during the image review process described herein, and one example is depicted in FIG. 6. Beneficially, pre-populating the user interface with this prediction of depicted defects can increase the speed with which human reviewers can successfully review and removed effective images, can increase the accuracy of the review process by revealing potential defects that the user may not have noticed (see example 510 in FIG. 5), and also provides the user opportunity to correct any erroneous predictions made by the model by deselecting the corresponding defect. Pre-populating the user interface can include pre-selecting identified defects, while leaving non-identified defects unselected, or listing a textual description of the identified defects.

At optional block 455, the machine learning system 200 can receive user feedback regarding the classes depicted in the image. This can involve, for example, the user interface manager 318 logging any changes made by the user to pre-selected identified defects, non-selected defect, or any entries made by the user with respect to identified defects.

In some implementations, blocks 450 and 455 may be optional. For example, the accuracy of the machine learning system 200 may be tested and verified to be greater than a certain desired level of accuracy, and the steps involving human reviewers of the model output may be omitted. At block 460, the machine learning system 200 can accept or reject based on the determined depicted classes (either predicted and verified/modified by a human user, or just predicted). In other implementations outside of the image defect context, block 460 can involve storing the image with data indicating identified depicted classes.

Figure 5:
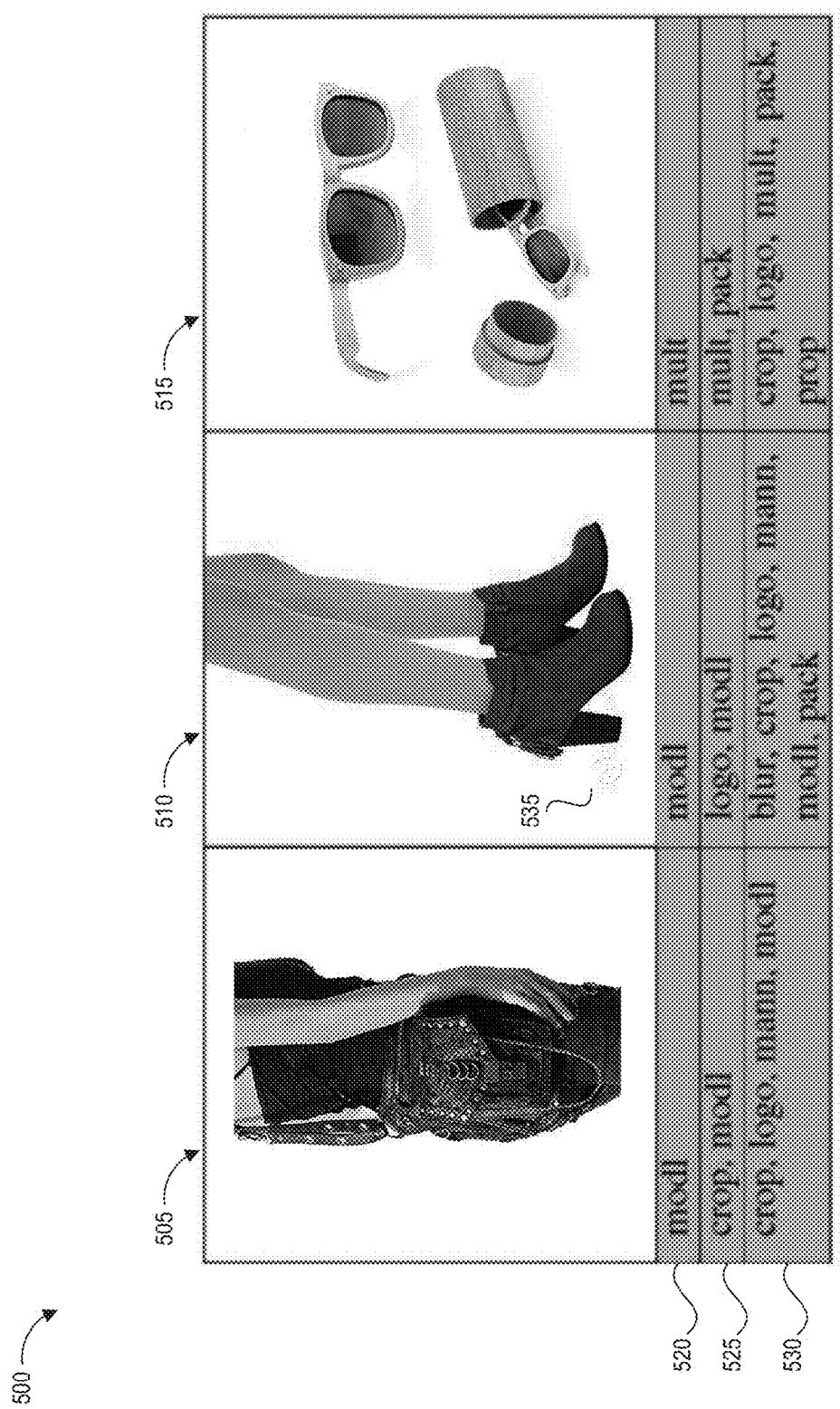
FIG. 5 is an example of three tests of a multi-label machine learning system trained according to FIG. 4A.
Figure 6:
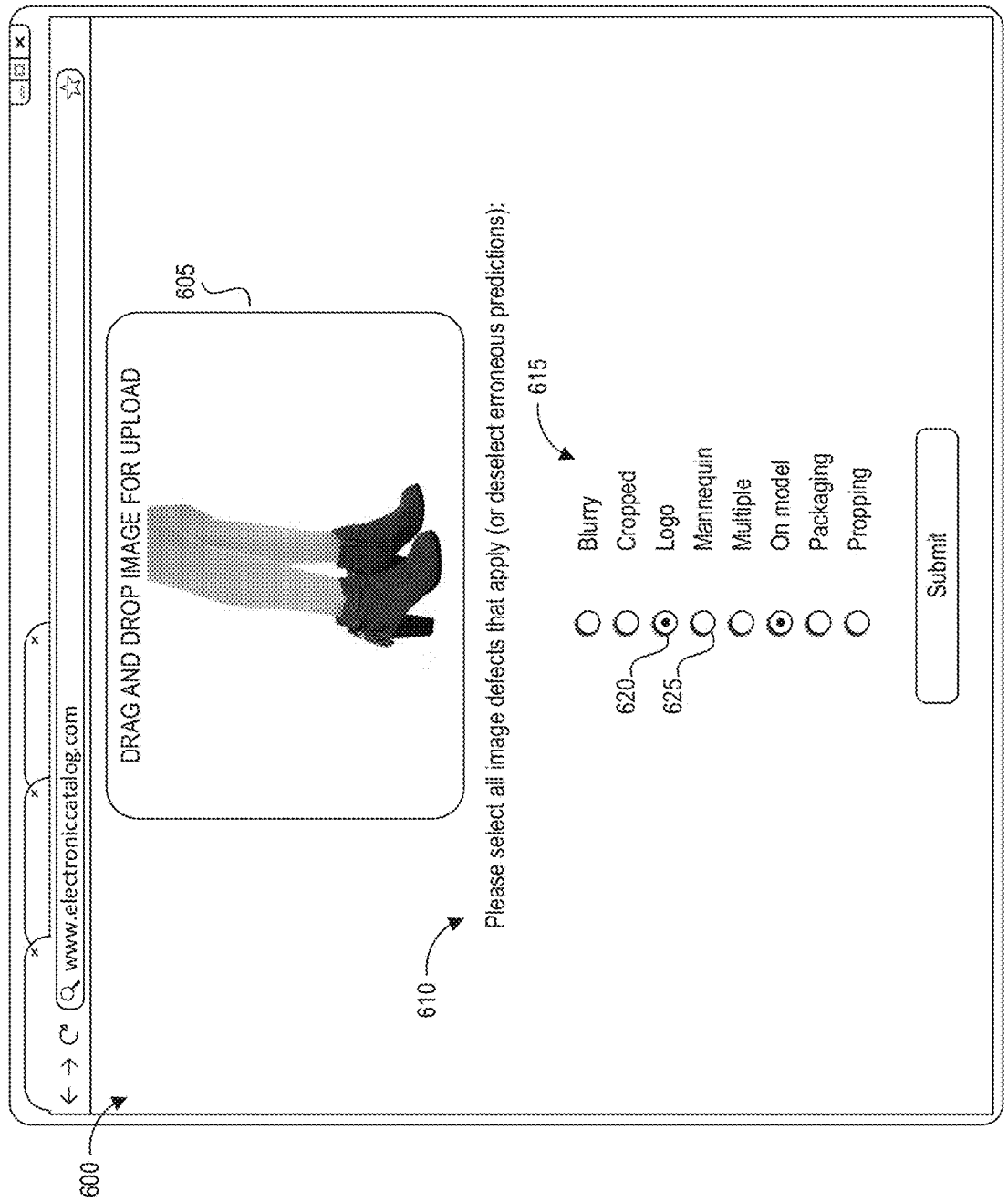
FIG. 6 depicts an example graphical user interface that can be used to verify predictions generated by the process of FIG. 4B.

Overview of Example Artificially Intelligent Image Review and Associated User Interfaces FIG. 5 is an example 500 of the outcomes of three tests of a multi-label machine learning system trained according to FIG. 4A. The first test 505 depicts a model wearing a purse, the second test 510 depicts a model wearing a pair of ankle boots, and the third test 515 depicts a pair of sunglasses in addition to the sunglasses peeking out of their packaging. Below the image of each test, a first row 520 depicts the human annotations of the image, the second row 525 depicts the output of the model 200B, and the third row depicts the output of the models 200A/200B. As illustrated, the model 200B trained using a penalty yields better and more complete reasons than the humans, and the models 200A/200B trained without the penalty chose too many reasons. In many tested instances, the models 200A/200B trained without the penalty chose all possible rejection reasons.

Specifically, in the first test 505 the human reviewer only annotated the "on model" defect. The model 200A/200B predicted the defects "cropped", "logo," "on model," and "mannequin", which includes two defects not actually depicted in the image ("logo" and "mannequin"). The model 200B predicted the defects "cropped" and "on model", which more accurately reflects the defects depicted in the image than either the human reviewer's annotation or the prediction of the model 200A/200B.

In the second test 510, the human reviewer only annotated the "on model" defect. The model 200A/200B predicted the defects "blurred", "cropped", "logo," "on model," "mannequin", and "packaging", which includes four defects not actually depicted in the image ("blurred", "cropped", "mannequin", and "packaging"). Although the legs of the model in the image are cropped, the item (the boots) are not cropped and so this defect is not actually present. The model 200B predicted the defects "logo" and "on model", which more accurately reflects the defects depicted in the image than either the human reviewer's annotation or the prediction of the model 200A/200B. Though not easily noticeable, a logo in the form of a watermark 535 is depicted in the image of test 510. The contrast has been increased and the brightness reduced in FIG. 5 to attempt to show the watermark 535 more clearly. In the original image, this watermark was only very faintly visible and thus was very easy to go unnoticed even upon normal review of the image. In this example, the model 200B appears to be able to identify defects that may be very difficult for humans to notice.

In the third test 515 the human reviewer only annotated the "multiple" defect. The model 200A/200B predicted the defects "cropped", "logo," "multiple," and "packaging", and "propped," which includes three defects not actually depicted in the image ("logo", "packaging", and "propped"). The model 200B predicted the defects "multiple" and "packaging", which more accurately reflects the defects depicted in the image than either the human reviewer's annotation or the prediction of the model 200A/200B.

FIG. 6 depicts an example graphical user interface 600 that can be used to verify predictions generated by the process of FIG. 4B. The user interface 600 can include an interactive feature 605 that allows the user to upload an image, for example an image of particular item being listed in an electronic marketplace. This example uses the image from test 510 of FIG. 5. After the image is uploaded, its pixel values can be forward passed through a trained defect detection model 200A, 200B in order to generate a prediction regarding depicted defects, as described herein.

The user interface 600 can also include a defect selection portion 610 that prompts the user to select all image defects that apply. Because some defects predicted by the model may not be present, the prompt can also ask the user to deselect erroneous predictions, as illustrated. The defect selection portion 610 can include a listing 615 of the potential defects, as well as user-selectable features 620, 625 that enable the user to identify to the user interface manager 318 which defects are present. In this example, the user-selectable features comprise radio buttons. Other implementations can use checkboxes, click-based highlighting, or other suitable input mechanisms.

Consistent with the model output described with respect to the test 510 of FIG. 5, the user-selectable features corresponding to the "logo" and "on model" defects have been pre-selected in the user interface 600 (selected radio buttons 620). The user-selectable features corresponding to the "multiple" and "NWB" defects have not been pre-selected in the user interface 600 (non-selected radio buttons 625) because these defects were not identified by the model 200B. As prompted, the user can select the user-selectable feature of any additional defects that are depicted but were not predicted by the model and can de-select the user-selectable feature of any defects that are not depicted but were predicted by the model. The user can then submit these identifications.

Beneficially, the use of the disclosed artificially intelligent image reviewer can enable these defect predictions to be provided to the uploading user at (or shortly after) the time of uploading a new image. This can reduce the need for a host of the electronic catalog to provide additional image reviewers, reduces the time that elapses between upload of a new image and review of the image, and also provides feedback regarding compliance with image quality standards directly to the uploading user.

In some implementations, the defect selection portion 610 may be presented on a separate user interface from the interactive uploading feature 605, and it may be presented some time delay after the user has uploaded the image (e.g., in an electronic message to the uploading user).

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration.

Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system, comprising:
   a data repository that stores a plurality of images with incomplete indications of which of a plurality of types of defects are present, said incomplete indications provided by human reviewers that accept and reject images based on whether the images include any of the plurality of types of defects; and
   a computing system comprising one or more processors, the computing system programmed with executable instructions to use the data repository to train a machine learning model according to a process that comprises:
      labeling the plurality of images based on the incomplete indications, wherein labeling the plurality of images comprises, for a first image rejected for having a first of the plurality of defect types, labeling the first image with a positive label for the first defect type and with an unknown label for each additional defect type of the plurality of defect types, each unknown label indicating that the respective type of defect may or may not be present; and
      training the machine learning model with the plurality of labeled images to detect each of the plurality of defect types, wherein training the machine learning model comprises, based on said positive and unknown labels of the first image, treating the first image as a positive sample for the first defect type but not as a negative sample for any of the additional defect types.

2. The system of claim 1, wherein training the machine learning model comprises, based the positive and unknown labels of the first image, updating parameters of the model differently for the first defect type than for the additional defect types.

3. The system of claim 1, wherein labeling the plurality of images further comprises, for a second image accepted by a human reviewer, labeling the second image with a negative label for each of the plurality of defect types, to thereby cause the second image to be used as a negative sample for each of the plurality of defect types during said training of the machine learning model.

4. The system of claim 1, wherein training the machine learning model comprises updating parameters of the model using a loss function that measures a difference between a prediction made by the machine learning model and an expected value.

5. The system of claim 4, wherein the loss function prevents the machine learning model from being penalized for making an erroneous prediction for a defect type having an unknown label.

6. The system of claim 4, wherein the loss function is responsive to the first image having the unknown label for a particular defect type by refraining from using any information associated with the particular defect type to supervise training of the model.

7. The system of claim 1, wherein the machine learning model is a neural network, and wherein training the machine learning model comprises using the positive and unknown labels to determine how to update weights of the neural network.

8. A computer-implemented process, comprising, by execution of program instructions by a computing system:
   receiving a plurality of images that have been reviewed by human reviewers who accept and reject images based on whether the images include any of a plurality of types of defects, wherein rejected images include indications of one or more types of defects found;
   creating a training dataset of labeled images for training a machine learning model to detect each of the plurality of types of defects, wherein creating the training dataset comprises:
      for a first image accepted by a human reviewer, labeling the first image with a negative label for each of the plurality of defect types; and
      for a second image rejected by a human reviewer for including a first of the plurality of defect types, labeling the second image with a positive label for the first defect type and with an unknown label for each additional defect type of the plurality of defect types, each unknown label indicating that the respective type of defect may or may not be present; and
   training the machine learning model with the training dataset, wherein training the machine learning model comprises:
      based on the negative labels of the first image, using the first image as a negative sample for each of the plurality of defect types; and
      based on the positive and unknown labels of the second image, using the second image as a positive sample for the first defect type but not as a negative sample for any of the additional defect types.

9. The process of claim 8, wherein training the machine learning model comprises, based the positive and unknown labels of the second image, updating parameters of the model differently for the first defect type than for each additional defect type.

10. The process of claim 8, wherein training the machine learning model comprises updating parameters of the model using a loss function that measures a difference between a prediction made by the machine learning model and an expected value.

11. The process of claim 10, wherein the loss function prevents the machine learning model from being penalized for making an erroneous prediction for a defect type having an unknown label.

12. The process of claim 10, wherein the loss function is responsive to an image having an unknown label for a particular defect type by refraining from using any information associated with the particular defect type to supervise training of the model.

13. The process of claim 10, wherein the loss function uses the unknown labels to determine how to update parameters of the model.

14. The process of claim 8, wherein the machine learning model is a neural network, and training the neural network comprises using the positive, negative and unknown labels to determine how to update weights of the neural network.

15. Non-transitory computer storage comprising program instructions that instruct a computing system to perform a process that comprises:
- accessing a data repository that stores a plurality of images with incomplete indications of which of a plurality of types of defects are present, the incomplete indications provided by human reviewers that accept and reject images based on whether the images include any of the plurality of types of defects; and
- labeling the plurality of images based on the incomplete indications, wherein labeling the plurality of images comprises, for a first image rejected for having a first of the plurality of defect types, labeling the first image with a positive label for the first defect type and with an unknown label for each additional defect type of the plurality of defect types, each unknown label indicating that the respective type of defect may or may not be present; and
- training the machine learning model with the plurality of labeled images to detect each of the plurality of defect types, wherein training the machine learning model comprises, based on said positive and unknown labels of the first image, treating the first image as a positive sample for the first defect type but not as a negative sample for any of the additional defect types.

16. The non-transitory computer storage of claim 15, wherein the executable program instructions further instruct the computing system to, based the positive and unknown labels of the first image, update parameters of the model differently for the first defect type than for the additional defect types.

17. The non-transitory computer storage of claim 15, wherein the executable program instructions further instruct the computing system to label a second image accepted by a human reviewer with a negative label for each of the plurality of defect types, to thereby cause the second image to be used as a negative sample for each of the plurality of defect types during said training of the machine learning model.

18. The non-transitory computer storage of claim 15, wherein the executable program instructions further instruct the computing system to update parameters of the model using a loss function that measures a difference between a prediction made by the machine learning model and an expected value.

19. The non-transitory computer storage of claim 18, wherein the loss function prevents the machine learning model from being penalized for making an erroneous prediction for a defect type having an unknown label.

20. The non-transitory computer storage of claim 18, wherein the loss function is responsive to the first image having the unknown label for a particular defect type by refraining from using any information associated with the particular defect type to supervise training of the model.

* * * * *